(12) United States Patent
Brian

(10) Patent No.: US 10,413,029 B2
(45) Date of Patent: Sep. 17, 2019

(54) MAGNETICALLY ATTACHABLE ORGANIZATIONAL AID FOR ELECTRONIC DEVICES

(71) Applicant: Michael W. Brian, Lubbock, TX (US)

(72) Inventor: Michael W. Brian, Lubbock, TX (US)

(*) Notice: Subject to any disclaimer, the term of this patent is extended or adjusted under 35 U.S.C. 154(b) by 161 days.

(21) Appl. No.: 15/621,146

(22) Filed: Jun. 13, 2017

(65) Prior Publication Data

US 2017/0303657 A1    Oct. 26, 2017

Related U.S. Application Data

(63) Continuation-in-part of application No. 15/137,798, filed on Apr. 25, 2016, now Pat. No. 9,693,614.

(51) Int. Cl.
| | | |
|---|---|---|
| B65D 85/00 | (2006.01) | |
| A45C 11/24 | (2006.01) | |
| B65D 30/22 | (2006.01) | |
| A45C 13/10 | (2006.01) | |
| A45C 11/34 | (2006.01) | |
| A45C 13/00 | (2006.01) | |
| A45C 11/00 | (2006.01) | |
| A45C 13/02 | (2006.01) | |

(52) U.S. Cl.
CPC ............. *A45C 11/24* (2013.01); *A45C 11/34* (2013.01); *A45C 13/001* (2013.01); *A45C 13/103* (2013.01); *A45C 13/1069* (2013.01); *B65D 31/12* (2013.01); *A45C 2011/003* (2013.01); *A45C 2013/025* (2013.01); *B65D 2313/04* (2013.01); *G06F 2200/1633* (2013.01)

(58) Field of Classification Search
CPC ..... B65D 31/12; B65D 2313/04; A45C 11/00; A45C 13/001; A45C 13/1069; A45C 2011/003; A45C 2013/025; G06F 2200/1633
USPC ............... 206/320, 576, 818; 383/11, 22, 39
See application file for complete search history.

(56) References Cited

U.S. PATENT DOCUMENTS

| | | | |
|---|---|---|---|
| 3,717,188 A | 2/1973 | Green | |
| 4,736,853 A | 4/1988 | O'Mara | |
| 5,533,809 A * | 7/1996 | Gorman | B65D 33/14 |
| | | | 206/320 |
| 5,598,923 A | 2/1997 | Owens | |
| 5,664,673 A * | 9/1997 | Perry | B43K 23/001 |
| | | | 206/371 |
| 5,890,639 A * | 4/1999 | Hancock | A45C 3/00 |
| | | | 224/42.11 |
| 6,116,412 A * | 9/2000 | Rogers | A45C 11/04 |
| | | | 206/5 |
| 6,149,001 A * | 11/2000 | Akins | A45C 13/26 |
| | | | 150/165 |
| 6,269,948 B1 * | 8/2001 | Jackson | A45C 7/0095 |
| | | | 108/43 |
| 6,336,555 B1 | 1/2002 | Breeden | |
| 7,921,997 B2 | 4/2011 | Burns | |

(Continued)

*Primary Examiner* — Luan K Bui
(74) *Attorney, Agent, or Firm* — Ross Barnes LLP; Monty L. Ross

(57) ABSTRACT

The combination of an organizational aid having at least one storage pocket and a device support article for tablets and readers, each having an array of cooperatively aligned ferromagnetic elements that exhibit magnetic attraction sufficient to maintain the organizational aid in a desired positional relationship to the device support article.

11 Claims, 7 Drawing Sheets

(56) References Cited

U.S. PATENT DOCUMENTS

| | | |
|---|---|---|
| 8,418,852 B2 | 4/2013 | Ziemba |
| 8,978,886 B2 | 3/2015 | Ziemba |
| 2007/0147712 A1 | 6/2007 | Ozdeger Donovan et al. |
| 2010/0065454 A1* | 3/2010 | Badillo .................... A45C 9/00 |
| | | 206/320 |
| 2011/0198251 A1* | 8/2011 | Alamo .................. A45C 11/18 |
| | | 206/320 |
| 2015/0351271 A1 | 12/2015 | Dawson |

* cited by examiner

MAGNETICALLY ATTACHABLE ORGANIZATIONAL AID FOR ELECTRONIC DEVICES

CROSS-REFERENCE TO RELATED APPLICATION

This application is a continuation-in-part of U.S. application Ser. No. 15/137,798, filed Apr. 25, 2016, which issued as U.S. Pat. No. 9,693,614 on Jul. 4, 2017.

BACKGROUND OF THE INVENTION

1. Field of the Invention

This invention relates to organizational aids that are selectively attachable to and removable from electronic devices such as tablets and laptops. The subject device desirably comprises a plurality of storage pockets and is particularly useful with electronic devices having surfaces to which magnets are attachable. Use with electronic devices such as an iPad® and associated cover or a Microsoft Surface™ personal computing device configured for use in conjunction with an external keyboard or mouse is preferred.

2. Description of Related Art

Users of modern personal electronic devices, and particularly slim-line tablets usable with a detachable covers or keyboard or mouse, frequently encounter a need for compact, readily accessible storage for pens, pencils, flash drives, a wireless mouse, or the like, without having to carry a separate bag or pouch to transport such articles. Prior art of record in the parent application includes: U.S. Pat. Nos. 3,717,188; 4,736,853; 5,598,923; 6,149,001; 6,336,555; 7,921,997; 8,418,852 and 8,978,886; and U.S. Pub. Nos. 2007/0147712 A1 and 2015/0351271 A1.

SUMMARY OF THE INVENTION

The organizational aid disclosed here is suitable for use with a personal electronic computing device such as an iPad® with a detachable cover or a Microsoft Surface™ device having a screen side and a keyboard side that are preferably but not necessarily detachable from each other. Such devices will preferably have an outwardly facing surface to which magnetic elements such as magnetic strips or magnets are attachable. The subject organizational aid desirably comprises a plurality of discrete pockets or divided areas, at least some of which are provided with closures. In one embodiment of the invention, at least one, and preferably two, spaced-apart flexible security tabs are optionally positionable between the screen and keyboard sides of the personal electronic computing device to secure the organizational aid in position on the outwardly facing surface of the device when the screen and keyboard sides are folded back together following use. At least one and preferably two or more non-slip surface portions are desirably attached to a back surface of the organizational aid and are configured to provide facing and contacting engagement with an outwardly facing surface of the computing device; and at least one magnetic element attached to, disposed adjacent to or embedded in the non-slip surface portion to releasably hold the organizational aid in a desired position relative to the outwardly facing surface of the electronic device. If desired, at least one magnetic element can be attached to or embedded inside each of the non-slip surface portions, and the magnets and non-slip surfaces will cooperate with the security tab or tabs to hold the organizational aid in place during transport of the electronic device.

According to another embodiment, the organizational aid of the invention is configured for use with and releasable magnetic attachment to the rear surface of a shell, skin, case, sleeve or other similar article into which an electronic device such as a tablet or reader is receivable to support and protect the device. With this embodiment, security tabs are not required because the shell, skin, case or other similar article desirably comprises an array of ferrous metal elements disposed inside of or recessed into a major supporting surface of the article so that magnetic elements of the organizational aid of the invention are attracted to cooperatively aligned magnetic elements of the article with sufficient force to hold the organizational aid in a position of selectively releasable attachment to the rear of a shell, skin, case, or sleeve of an electronic device such as a tablet or reader during transportation, storage or use of the device. Alternatively, an array of magnetic elements can be disposed inside the case and a cooperating array of ferrous metal element elements can be disposed inside the organizational aid of the invention. In each case, however, the attractive force between the magnets and the ferrous metal elements should be sufficient to hold the organizational aid against the shell, skin, case or other similar article even with the additional weight of objects placed inside the pockets of the organizational aid for transport or storage.

BRIEF DESCRIPTION OF THE DRAWINGS

The system and method of the invention are further described and explained in relation to the following drawings wherein.

Figure 1:
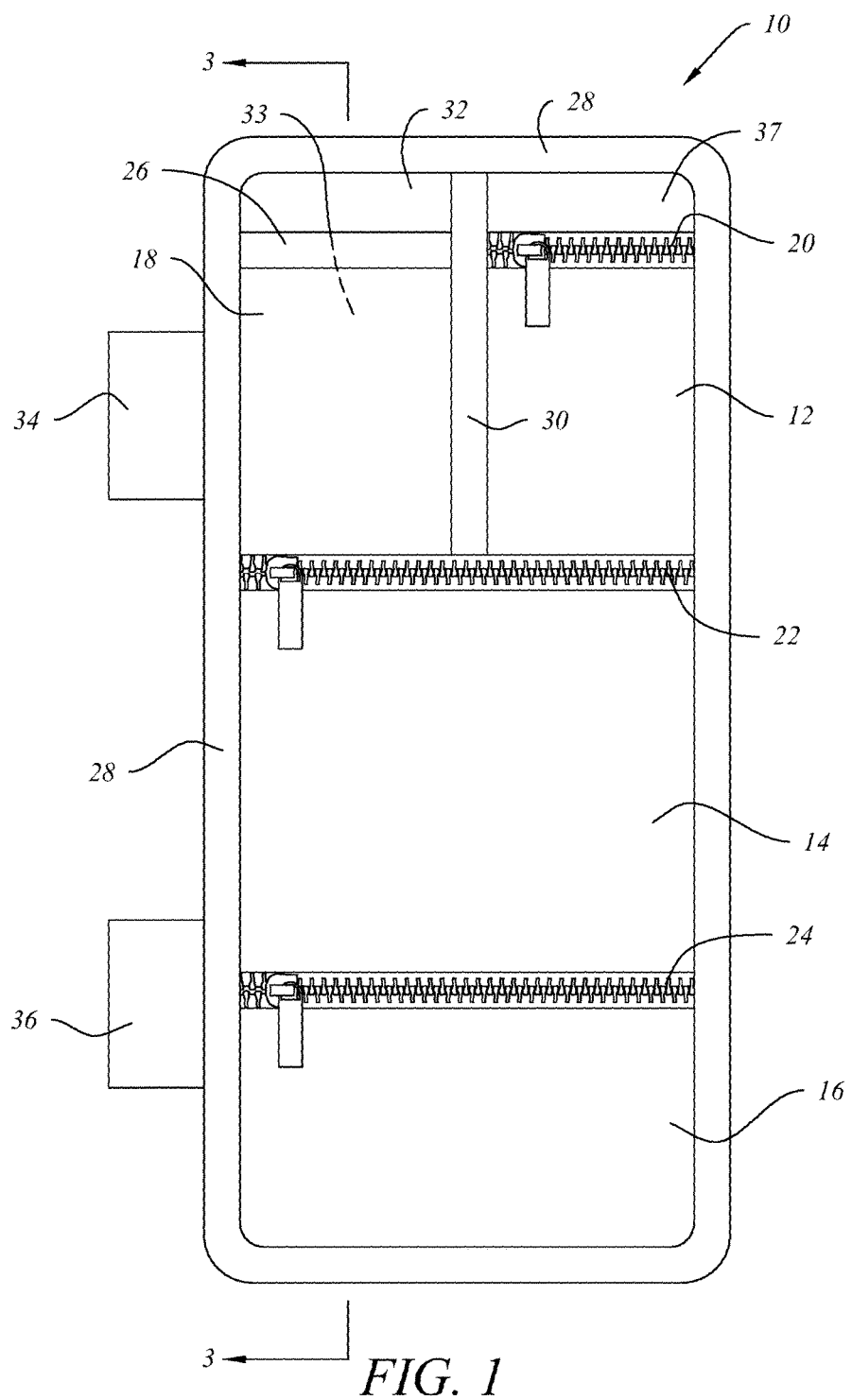
FIG. 1 is a top plan view of one embodiment of an organizational aid of the invention.

It is noted that the drawings are illustrative and diagrammatic in nature, are not drawn to scale, and that the ratio and proportion of various parts of the invention can vary from those depicted in the drawings. It is also emphasized that the drawings represent only one of many different configurations of the invention that can be made within the scope of the appended claims.

DESCRIPTION OF THE PREFERRED EMBODIMENTS

Referring to FIG. 1, organizational aid 10 further comprises a plurality of individual pockets 12, 14, 16, 18 that are desirably formed by overlaying appropriately sized swatches of a suitable, preferably water resistant, fabric over a substantially continuous backing sheet 32 (best seen in FIG. 2) and then stitching, gluing or otherwise attaching a binding material around the edges of each swatch. In the embodiment shown, zippers 20, 22, 24 are used to close pockets 12, 14, 16, respectively, and binding strip 28 is wrapped over the peripheral edges of organizational aid 10 to provide containment between the pockets and backing sheet 32. Flexible security tabs 34, 36 desirably project outwardly from one side of organizational aid 10 for insertion between the screen side and keyboard side of a personal electronic device as previously described in the Summary of the Invention. Security tabs 34, 36 are desirably made of a flexible, durable fabric and can be secured by stitching, gluing or another similarly effective fastening technique, to binding strip 28, back cover 32 (FIG. 2), or both. In the embodiment shown in FIG. 1, pocket 18 has an open edge covered by binding strip 26 that permits objects, possibly a wireless mouse, to be inserted into void 33 disposed between pocket 18 and the backing sheet behind the pocket.

Figure 2:
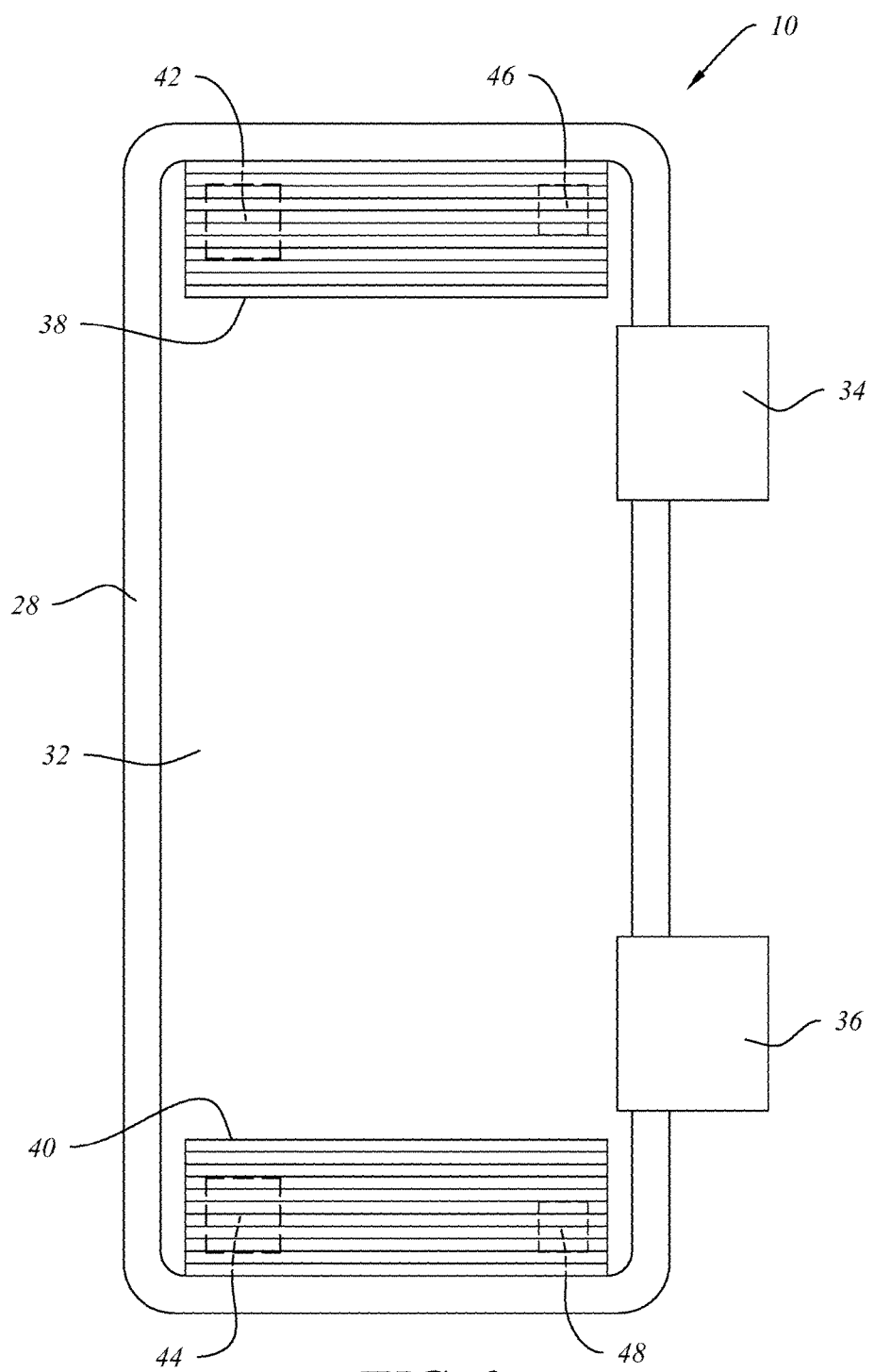
FIG. 2 is a bottom plan view the embodiment of FIG. 1.

Referring to FIG. 2, a plurality of rubbery, ribbed non-slip strips 38, 40 are attached to backing sheet 32 by stitching, gluing, or another similarly effective fastening technique suitable for such application. Rare-earth magnets 42, 44, 46, 48, preferably made of neodymium, are preferred for use in the invention. The magnets and non-slip strips are believed to cooperate in preventing organizational aid 10 from sliding about on the outwardly facing surface of the electronic device with which they are placed in contact during use or transport of the electronic device. Security tabs 34, 36, similarly attached to backing sheet 32 or binding strip 28, are sufficiently flexible that the portion insertable between the aligned edges of the screen and keyboard or cover portions of the electronic device can be folded in a U-shape as the screen and keyboard or cover portions are rotated into facing engagement with each other.

Figure 3:
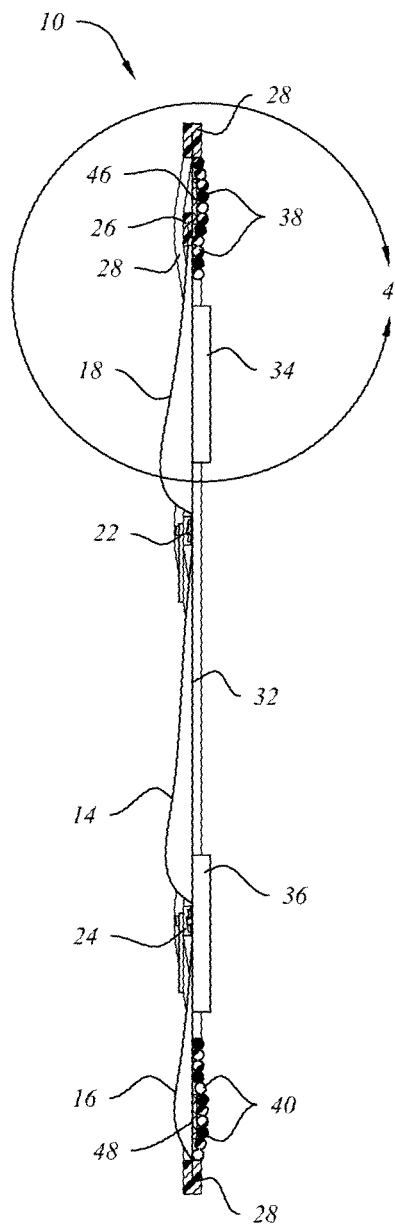
FIG. 3 is a cross-sectional side elevation view taken along line 3-3 of FIG. 1.
Figure 4:
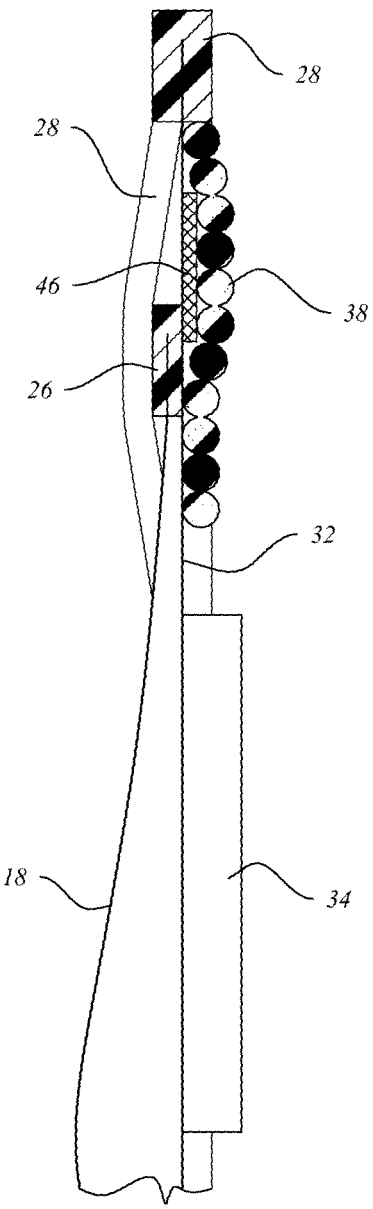
FIG. 4 is an enlarged detail view taken from FIG. 3.

Referring to FIGS. 3 and 4, it will be appreciated that backing sheet 32 can be the back wall of each of pockets 18, 14, 16 or, alternatively, each pocket can have its own back wall in addition to the backing sheet 32 if desired. The fabric used for making the backing sheet and the various pockets of organizational aid 10 can be made of the same or different flexible materials, and the use of various coated and uncoated, woven or unwoven fabrics, transparent polymeric sheeting, braided mesh, and the like are all contemplated for possible use within the scope of the invention. Similarly, other types of pocket closures, including for example and without limitation hook and loop fasteners, snaps, buttons, sliding Ziploc® seals and the like, can be used in place of one or more of the zippers shown in the accompanying drawings.

In circumstances where organizational aid 10 is used with electronic devices having outwardly facing surfaces that lack magnetically attachable areas, stick-on magnets of suitable polarity can be provided and attached in fixed relation to the electronic device so as to provide an attachment surface for the magnets embedded in or attached to organizational aid 10, thereby permitting its use, for example, with electronic devices having polymeric, aluminum, or other non-ferrous metal outer skins.

Figure 5:
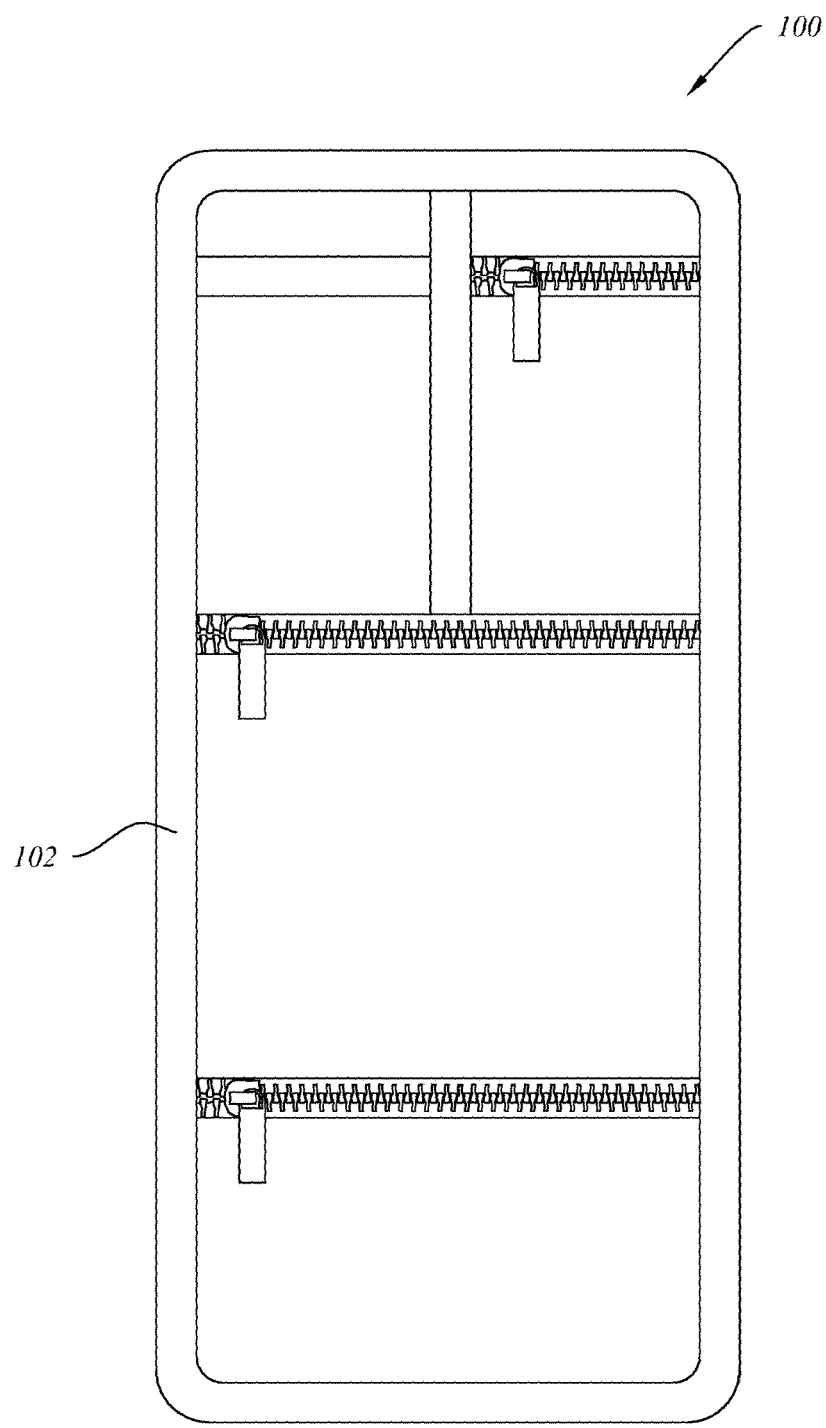
FIG. 5 is a top plan view of another embodiment of an organizational aid of the invention as is further depicted in FIGS. 5-8.
Figure 6:
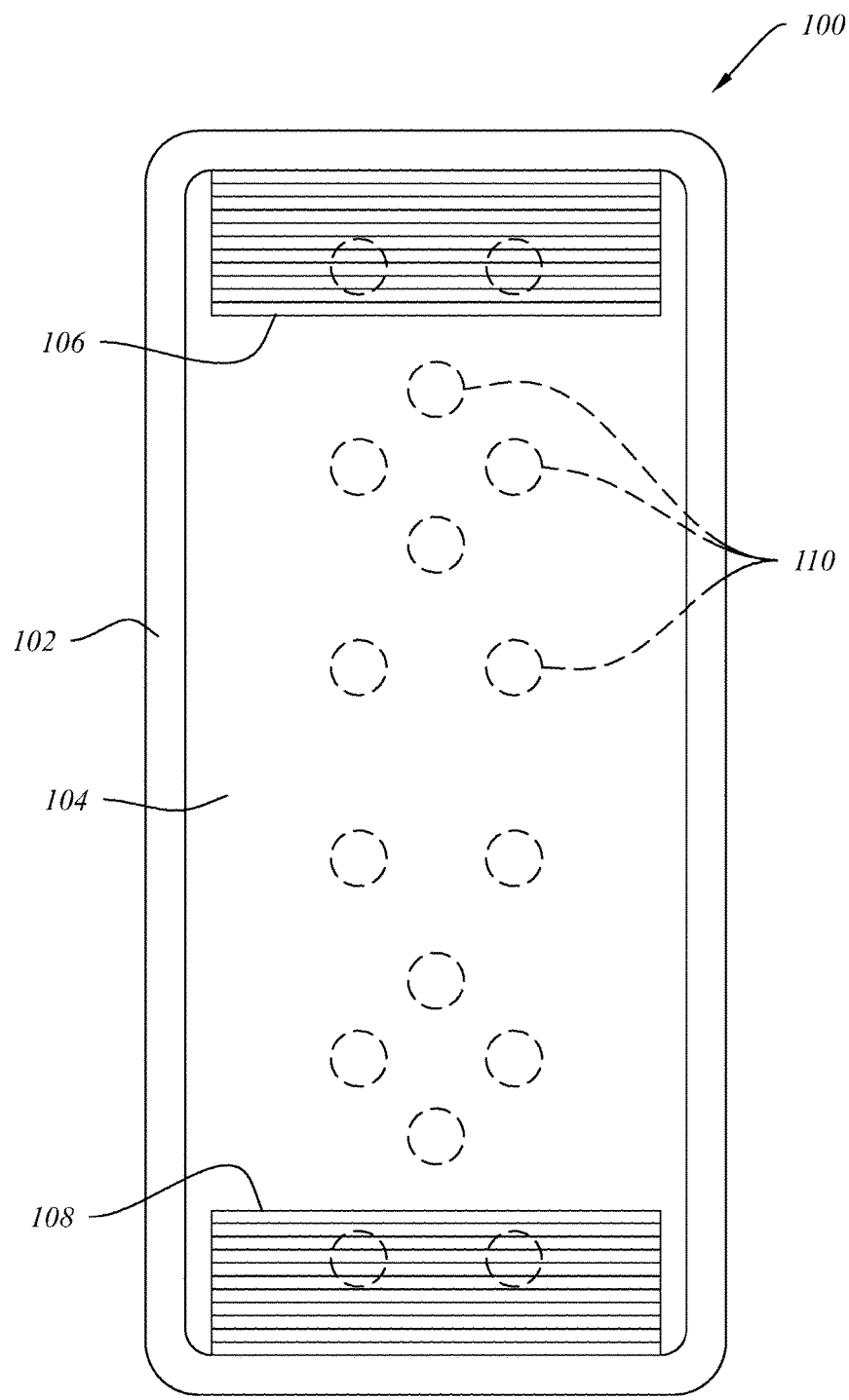
FIG. 6 is a bottom plan view of the embodiment of FIG. 5 showing in broken lines the placement of a first array of magnets (or, alternatively, ferrous metal elements) that is desirably disposed inwardly of the backing sheet of the organizational aid.

Referring to FIGS. 5-6, another organizational aid 100 is disclosed that comprises binding strip 102 and is otherwise configured similarly to organizational aid 10 as previously described except that security tabs 34, 36 are not present and an array comprising a plurality of magnets 110 is provided behind backing sheet 104 and non-slip strips 106, 108 for use in attaching organizational aid 100 to the bottom surface of a shell, skin, case, sleeve or other similar article into which an electronic device such as a tablet or reader is receivable to support and protect the device.

Figure 7:
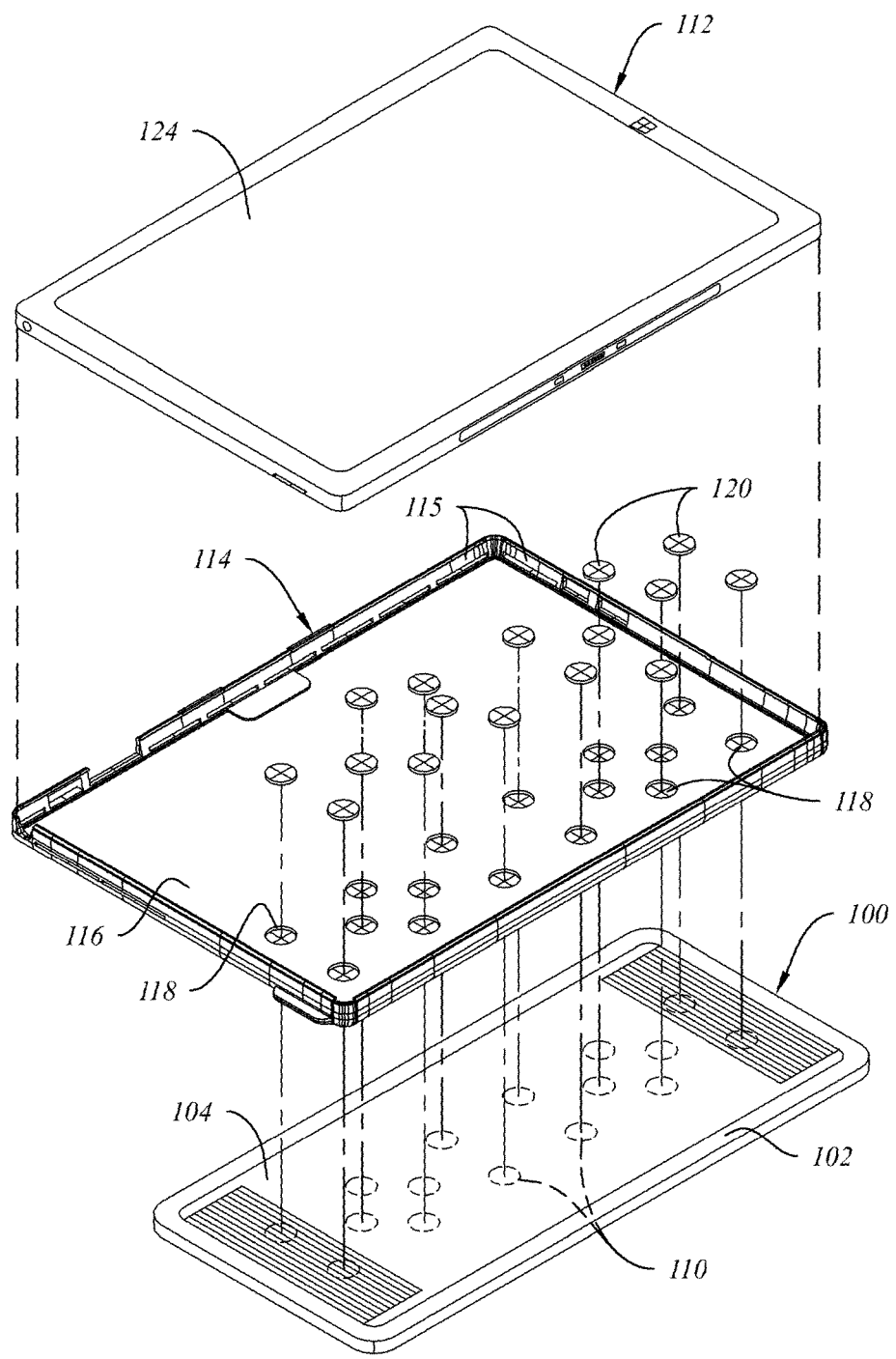
FIG. 7 is an exploded top perspective view showing the back side of the organizational aid of FIG. 5 aligned with the bottom of a case and positioned for releasable attachment to the bottom of the case, the case having a cooperating array of ferrous metal elements (or, alternatively, magnets) insertable into aligned recesses in the bottom, which case is aligned with an electronic tablet, reader or other device for releasable attachment to the electronic tablet or device.
Figure 8:
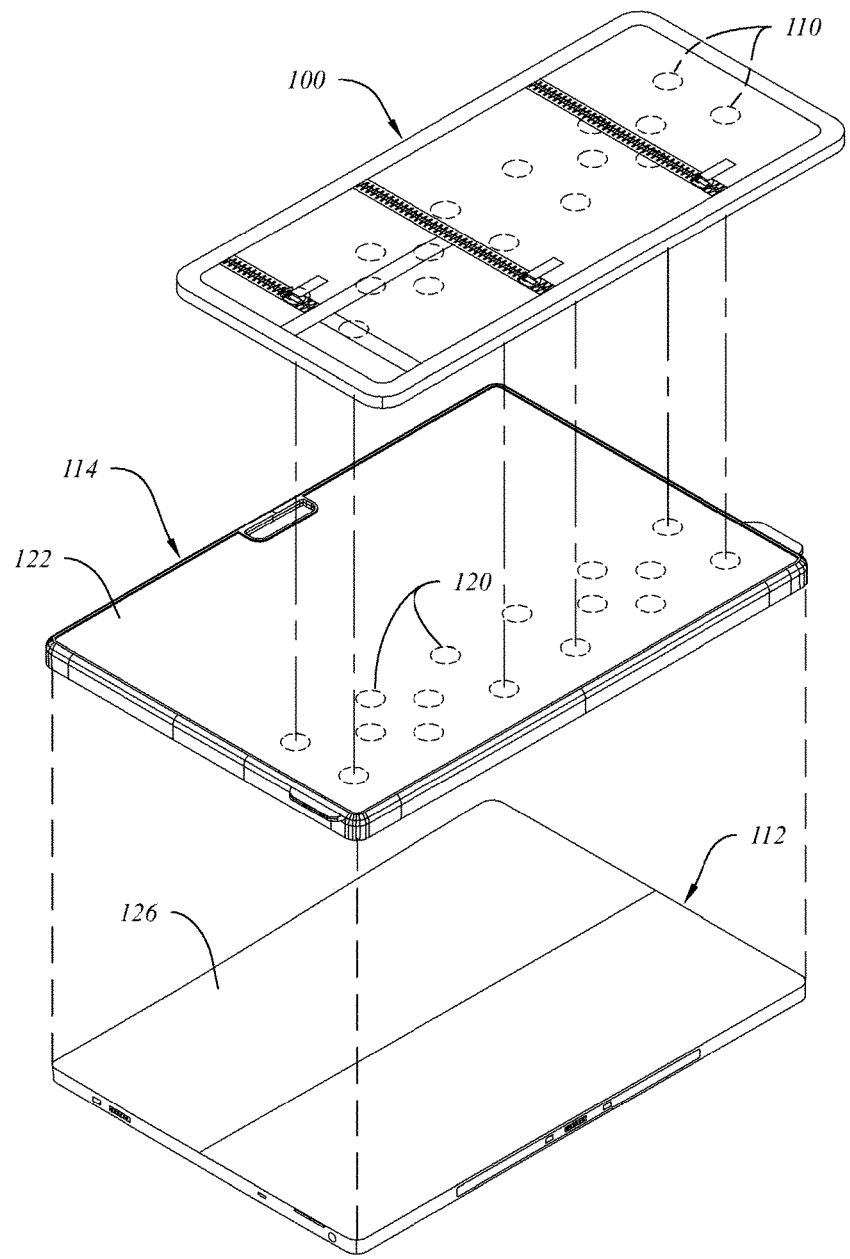
FIG. 8 is an exploded bottom perspective view of the elements of FIG. 7 with the second array of ferrous metal elements (or magnets) seated in the respective recesses in the bottom of the case.

Referring to FIGS. 7-8, a satisfactory embodiment of organizational aid 100 comprising an array of magnetic elements such as magnets 110 disposed behind backing sheet 104 inwardly of binding strip 102 (FIG. 7) and held in a substantially fixed position relative to backing sheet 104 and binding strip 102 by any suitable conventional means such as, for example, adhesive or pockets (not shown). Organizational aid 100 is shown in juxtaposition to and in alignment with case 114 comprising sidewalls 115 and bottom wall 116 (FIG. 7) having a bottom surface 122 (FIG. 8). As depicted, bottom wall 116 further comprises an array of recesses 118 into which a plurality of ferrous metal elements 120 are insertable. Ferrous metal elements 120 can be held in place by frictional engagement or using an adhesive, spring clip or other similarly effective conventional means as desired, and are desirably attracted to cooperating magnetic elements such as magnets 110 disposed inside organization aid 100. Magnets 110 are satisfactorily selected from neodymium discs or other similarly effective materials and selected to have a configuration and attractive force suitable for use in the present application.

It should also be appreciated by those of ordinary skill in the art upon reading this disclosure that an array of magnets having polarity such that they will be attracted to the array of magnets 110 can be used in place of ferrous metal elements 120 if desired. Similarly, ferrous metal elements can be substituted for magnets 110 if desired and magnets can then be substituted for ferrous metal elements 120 if desired, provided that at least one of the first or second arrays comprises magnets that can exhibit an attraction to the objects used in the other array that is sufficient to achieve the purposes of the invention for holding the subject organizational aid in contact with case 114 or such other shell, skin or sleeve with which tablet 112 or other similarly configured personal electronic device is engaged.

Referring to FIG. 8, organizational aid 100 is desirably installed by aligning it with bottom surface 122 of case 114 so that magnets 110 are aligned with ferrous elements 120, and then placing organizational aid 100 and case 114 in such proximity that the magnetic attractive force between magnets 110 and ferrous metal elements 120 will releasably attach organizational aid 100 to case 114. This can be done either before or after tablet 112 or another similarly configured reader or device is fitted into releasable engagement with bottom wall 116 inside side walls 115 of case 114. When assembled in this fashion, organizational aid 100 can be used, for example and without limitation, to store and carry accessories or supplies such as a stylus, pens, power or recharging cords, ear buds, and the like. In each embodiment the attractive force between the magnets and the ferrous metal elements is desirably sufficient to hold the organizational aid against the shell, skin, case or other similar article even with the additional weight of objects placed inside the pockets of the organizational aid for transport or storage.

Those of ordinary skill in the art will appreciate upon reading this specification and the description of embodiments in relation to the drawings that other modifications and alterations to the apparatus and methods may be made within the scope of the invention. In such case it is intended that the scope of the invention disclosed herein be limited only by the broadest reasonable interpretation of the appended claims to which the inventor is legally entitled.

I claim:

1. A combination of an organizational aid comprising a plurality of discrete storage pockets and a device support article configured to receive, support and protect an electronic device selected from tablets and readers, wherein:
   the organizational aid further comprises at least one non-slip surface portion and a first array of ferromagnetic elements, and is releasably attachable to the device support article;
   the device support article is releasably attachable to the electronic device and further comprises a second array of ferromagnetic elements;
   the first and second arrays of ferromagnetic elements are cooperatively aligned and exhibit magnetic attraction sufficient to maintain the organizational aid in a desired positional relationship to the device support article.

2. The combination of claim 1 wherein the device support article is selected from the group consisting of a shell, skin, case and sleeve.

3. The combination of claim 1 wherein the at least one non-slip surface portion is attached to a back surface of the organizational aid to provide facing and contacting engagement with an outwardly facing surface of the electronic device.

4. The combination of claim 3 wherein the at least one non-slip surface portion is two spaced-apart non-slip surface portions.

5. The combination of claim 1 wherein the organizational aid comprises a substantially continuous backing sheet, the plurality of discrete storage pockets disposed over the backing sheet; and a binding strip securing at least one of the plurality of discrete storage pockets to the backing sheet.

6. The combination of claim 5 wherein at least one of the plurality of discrete storage pockets comprises a closure member.

7. The combination of claim 5 wherein the first array of ferromagnetic elements is attached to or embedded between the backing sheet and the plurality of discrete storage pockets.

8. The combination of claim 1 wherein the second array of ferromagnetic elements is attached to or embedded in a wall of the device support article and cooperates with the first array of ferromagnetic elements to releasably hold the organizational aid in a desired juxtaposition to the device support article by magnetic attraction.

9. The combination of claim 1 wherein the first array of ferromagnetic elements comprises magnets and the second array of ferromagnetic elements comprises ferrous metal elements.

10. The combination of claim 1 wherein the first array of ferromagnetic elements comprises ferrous metal elements and the second array of ferromagnetic elements comprises magnets.

11. The combination of claim 1 wherein both the first and second arrays of ferromagnetic elements comprise magnets.

* * * * *